United States Patent [19]

Duran

[11] Patent Number: 5,074,730
[45] Date of Patent: Dec. 24, 1991

[54] ADJUSTABLE FLUSH MOUNTED BOLT

[75] Inventor: John A. Duran, Glendora, Calif.

[73] Assignee: Avibank Mfg., Inc., Burbank, Calif.

[21] Appl. No.: 616,647

[22] Filed: Nov. 21, 1990

[51] Int. Cl.[5] .............................................. F16B 23/00
[52] U.S. Cl. .................................... 411/403; 411/103; 411/374
[58] Field of Search .............. 411/403, 402, 373, 372, 411/371, 919, 374, 910, 103, 105, 107, 353, 999, 429, 431

[56] References Cited

U.S. PATENT DOCUMENTS

| | | | |
|---|---|---|---|
| 2,101,938 | 12/1937 | Giberson | 411/403 X |
| 2,133,409 | 10/1938 | Webb | 411/403 |
| 2,555,197 | 5/1951 | Lasky | 411/373 |
| 3,405,595 | 10/1968 | Peterson | 411/373 X |
| 3,785,670 | 1/1974 | Smith | 411/403 X |
| 4,822,227 | 4/1989 | Duran | 411/373 |
| 5,017,069 | 5/1991 | Stencel | 411/403 |

Primary Examiner—Rodney M. Lindsey
Attorney, Agent, or Firm—Poms, Smith, Lande & Rose

[57] ABSTRACT

A fastener assembly including a bolt having an enlarged head at one end and a nose at the other end. The bolt is threaded for threaded engagement to the stud of a receptacle assembly. The head of the bolt has a countersunk opening configured to a tool for rotating the same. This opening includes a spring biased releasable plug which is moved downwardly upon insertion of the tool to permit rotation thereof, then returns to a position flush with the exterior of the head of the bolt surrounding the opening. An adjusting screw is threaded into a mating threaded hole in the plug for adjusting the same so that the upper surface of the plug is flush with the upper surface of the bolt head.

10 Claims, 1 Drawing Sheet

U.S. Patent    Dec. 24, 1991    5,074,730
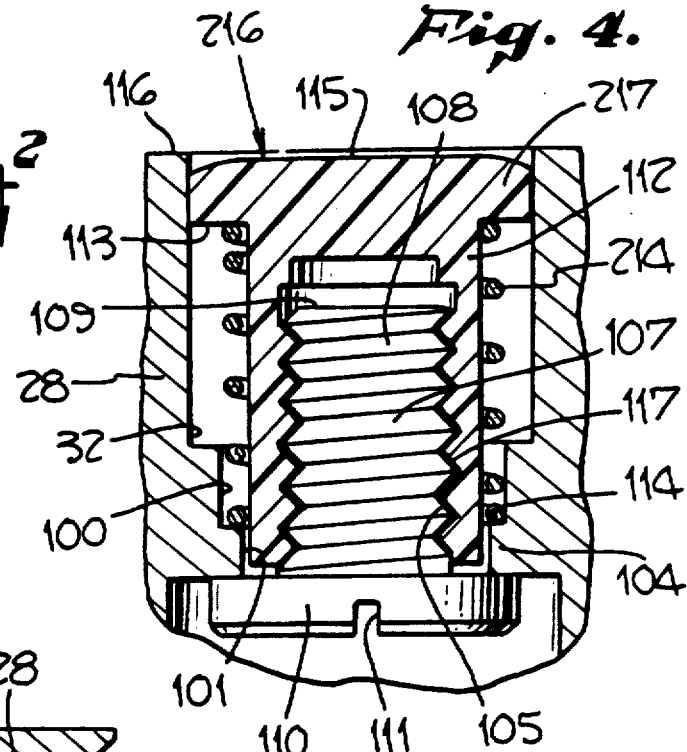
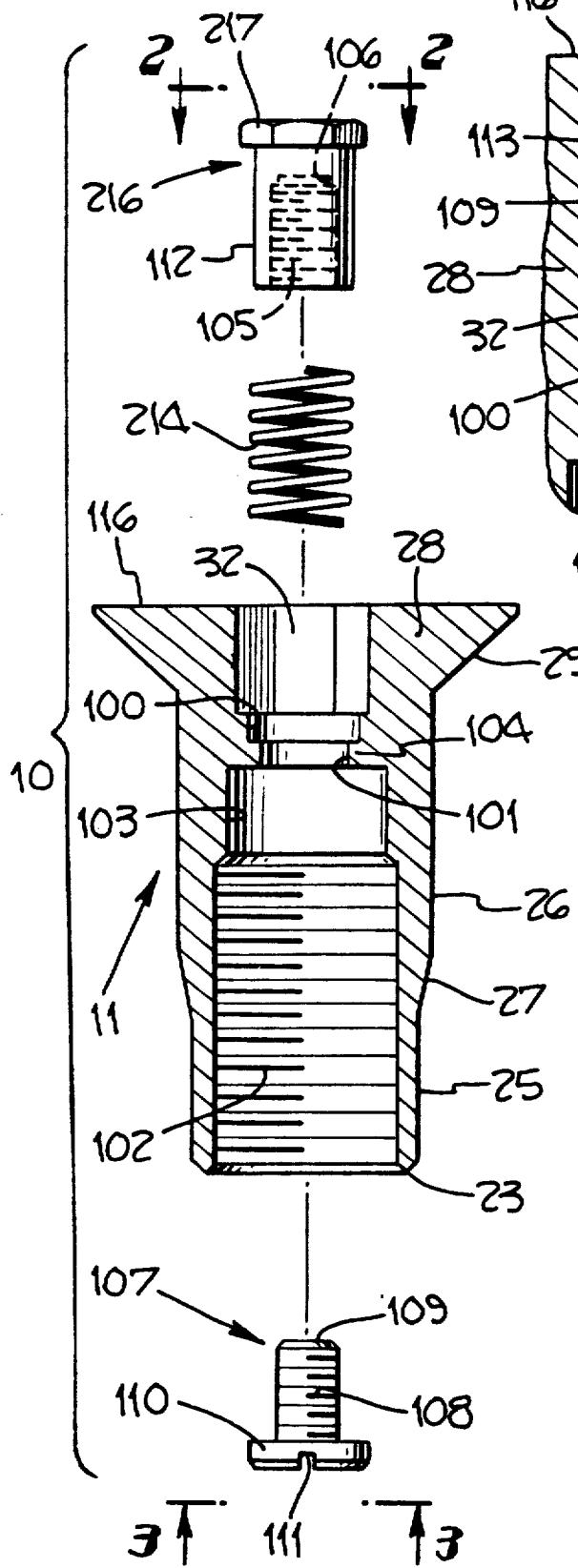
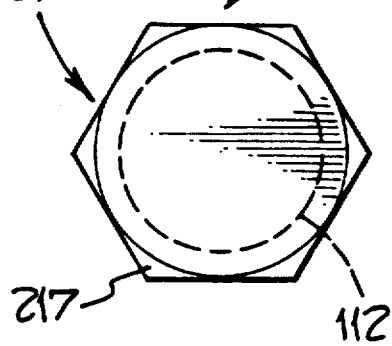
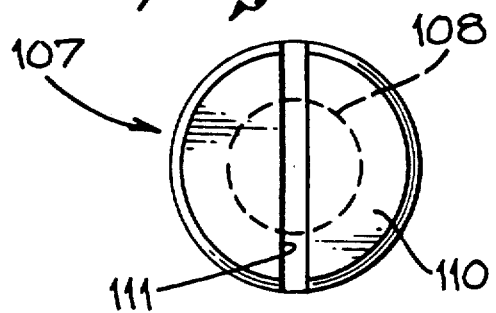

# ADJUSTABLE FLUSH MOUNTED BOLT

BACKGROUND OF THE INVENTION

1. Field of the Invention

The invention relates to quick action fasteners; and, more particularly, to improved bolts for use in quick action fasteners for panels of aircraft or the like.

2. Description of the Prior Art

Quick action fasteners are well known in the art. Flush head type bolts have a countersunk opening in the head thereof configured to a tool, such as a hex opening and Allen-type tool, whereby the tool can be inserted into the opening and the bolt rotated to install or remove the same.

These open holes can become contaminated and cause airdrag. These holes can be filled up with putty or the like after installation but subsequent adjustment or removal would require drilling out the dried putty. This of course is time consuming and results in lost man hours.

In my U.S. Pat. No. 4,822,227, commonly assigned, I disclose such a flush mounted bolt having a spring biased plug mounted in the bolt head. However, such plug cannot be adjusted to compensate for misalignment due to tolerance buildup. Finally, in certain environments, it is desirable that no surfaces or portions of the bolt protrude above the upper surfaces of the aircraft skin. There thus may be a need for absolute flushness.

There is thus a need for bolts having countersunk openings for engagement by a tool to rotate the same provided with adjustable means for automatically closing off the openings in a flush manner after rotation.

SUMMARY OF THE INVENTION

It is an object of this invention to provide an improved quick action fastener assembly having a retainer retaining a bolt having a head with a countersunk opening, to a panel, the opening having an adjustable plug normally closing off the same in a flush manner but allowing insertion of a tool therein.

It is further an object of this invention to provide such a fastener assembly having a flush mounted bolt with a head having a countersunk opening for engagement of a tool therein to rotate the same, the openings being normally closed off by an adjustable plug flush with the exterior of the bolt head.

These and other objects are preferably accomplished by a fastener assembly including a bolt having an enlarged head at one end and a nose at the other end. The bolt is threaded for engagement to the stud of a receptacle assembly. The head of the bolt has a countersunk opening configured to a tool for rotating the same. This opening includes a spring biased releasable plug mounted therein which is moved downwardly upon insertion of the tool to permit rotation thereof, then returns to a position flush with the exterior of the head of the bolt surrounding the opening.

An adjusting screw is threaded into a mating threaded hole in the plug for adjusting the same so that the upper surface of the plug is flush with the upper surface of the bolt head.

BRIEF DESCRIPTION OF THE DRAWING

FIG. 1 is an exploded view of one type of fastener assembly having a bolt head in accordance with the teachings of the invention, FIG. 2 is a view taken along lines 2—2 of FIG. 1;

FIG. 3 is a view taken along lines 3—3 of FIG. 1; and

FIG. 4 is a vertical sectional view of the fastener assembly of FIG. 1 installed in a panel.

DESCRIPTION OF THE PREFERRED EMBODIMENT

Referring now to FIG. 1 of the drawing, there is shown a fastener assembly 10 comprising a bolt 11. Bolt 11 is adapted to threadably engage a receptacle assembly, such as assembly 12 described and claimed in U.S. Pat. No. 4,822,227, the teachings of which are incorporated herein by reference.

Bolt 11 includes a blunt nose 23, and a generally cylindrical lower shank portion 25. Bolt 11 also includes an upper generally cylindrical shank portion 26 of an outer diameter substantially greater than the outer diameter of lower shank portion 25. A tapered portion 27 provides transition from upper shank portion 26 to lower shank portion 25. Bolt 11 has an enlarged head 28 at the upper end of shank portion 26 which head 28 is tapered at tapered portion 29 on its undersurface leading to shank portion 26. Head 28 is adapted to abut or bear against a countersunk opening in a panel as is well known in the art and as disclosed in U.S. Pat. No. 4,822,227, the teachings of which are incorporated herein by reference. Also, in U.S. Pat. No. 4,822,227, I disclose a bolt having an annular groove 24 adjacent nose 23 therein for receiving a retaining ring 41 therein. The bolt 11 in said patent has grooves 35 to 37 thereon and a ring 34 with ears 38 to 40 reciprocating on the bolt, the ears 38 to 40 riding in grooves 35 to 37. Again, such teachings are incorporated herein by reference.

A hex socket 32 may be provided in head 28 as is well known in the art for receiving a suitable wrench configured to socket 32 therein. A plug or plunger 216 is provided having an upper lip or flange 217 with an outer diameter generally the same as the inner diameter of socket 32. Plug or plunger 216 is similar in cross-section (e.g., hex) to the inner cross-section of the socket 32.

The entire plunger body may be made of a resilient material, such as Teflon, allowing the plunger 216 to be inserted into socket 32, the resiliency thereof allowing the flange 217 to engage the inner wall of socket 32. Teflon is a preferred material since it has good resiliency, is nonsticking and is its own lubricator. Water or other contamination is prevented from entering socket 32 around plunger 216 by reason of the engagement of flange 217 with the inner wall of the socket 32. Pushing down on plunger 216 with a hex tool, against the bias of spring 214 surrounding plug 216, allows rotation of the bolt 11 with the spring 214 returning plunger 216 to the FIG. 4 position after withdrawal of the tool.

Bolt 11 may have a stepped inner surface below socket 32, such as inner wall 100, which may be smooth and of lesser diameter than socket 32, and a second lower inner wall 101, also of lesser diameter than both socket 32 and wall 100 and also smooth walled. As seen in FIG. 4, the diameter of wall 101 may be generally related to the outer diameter of plunger 216. Spring 214 has an inner diameter generally related to the outer diameter of plunger 216, and an outer diameter generally related to the inner diameter of wall 100 (FIG. 4).

Bolt 11 is threaded on the interior, as at threads 102, FIG. 1, for receiving therein a threaded shaft, such as shaft 15 in U.S. Pat. No. 4,822,227, the teachings of which are incorporated herein by reference. Bolt 11 may also have an inner wall 103 above threads 102 and below wall 101 (apertured flange 104 separating the same).

As particularly contemplated in the present invention, adjustment means are provided to allow plug 216 to be moved axially yet allowing the upper surface thereof to be perfectly flush with the head 28 of the bolt 11. Such adjustment means eliminates the tolerance build up normally associated with the manufacture of such panel fasteners.

Thus, in the preferred embodiment, the aforementioned adjusting means includes a threaded portion 105 (FIG. 1) on the interior of plug 216 having an upper reduced section end 106. Such adjusting means also includes a screw 107 having a threaded shaft 108 and a nose 109 threadably receivable in threaded portion 105 and reduced section end 106, respectively. Screw 107 also has an enlarged head 110 with a slot 111 (see also FIG. 3) therein.

As seen in FIG. 4, spring 214 is placed about the generally cylindrical body portion 112 of plug 216 which plug 216 is then placed in socket 32. Hexagonally shaped flange 217 mates with hexagonally shaped socket 32 in a generally close fit relationship thereto. The body portion 112 of plug 216 extends into the lower end of socket 32 defined by wall 101. Spring 214 is thus disposed between the underside 113 of flange 217 and the upper surface 114 of socket 32 of the portion thereof defined by wall 101.

Screw 107 is now inserted into the interior of bolt 11 through the threaded bottom portion 25 thereof and into threaded engagement with the threaded portion 105 of plug 216. A screw driver (not shown) or the like is now placed in slot 111 and screw 107 is threaded into plug 216 until head 110 abuts against flange 104. As seen in FIG. 4, the upper surface 115 of flange 217 of plug 216 is generally flush with upper surface 116 of bolt head 28.

Thus, plug 216 can be moved downwardly in FIG. 4 upon insertion into socket 32 of a like configured tool (not shown), against the bias of spring 214, to permit rotation thereof as is well known in the art. Plug 216 will then return to the normal flush position, as seen in FIG. 4, upon removal of the tool.

The adjusting means (screw 107 and threaded portion 105) allows the plug 216 to be adjusted axially so that the top or upper surface 113 can remain perfectly flush with the top or upper surface 116 of bolt 11.

Although a hexagonally shaped socket 32 is disclosed, obviously any suitable configured socket may be used. Once the screw 107 is adjusted so as to have the upper surface 115 of plug 216 flush with the upper surface 116 of bolt 11, to compensate for tolerance buildup as heretofore discussed, it is desirable to lock screw 107 to plug 216 so that they do not rotate relative to each other which would cause plug 216 to move up or down. Preferably, such locking means should be self-locking. In a preferred embodiment of the invention, an adhesive material 117 (FIG. 4) in a dry state is applied to the threaded shaft 108 prior to insertion of screw 107 into threaded portion 105. This adhesive material 117 then sets and forms a self locking relationship between the threads of screw 107 and the mating threads of plug 216.

As heretofore discussed, a receptacle assembly, such as assembly 12, may be secured to bolt 11 as disclosed in U.S. Pat. No. 4,822,227, the teachings of which are incorporated herein by reference.

Any suitable self locking means may be provided between screw 107 and plug 216. A suitable adhesive is Dri-Loc, an adhesive manufactured and sold by Loctite Corp., of Connecticut.

Bolt 11 is of course assembled to panel structure as disclosed in FIG. 2 of U.S. Pat. No. 4,822,227, the teachings of which are incorporated herein by reference.

It can be seen that there is disclosed a flush mounted bolt assembly having a plug mounted in a bolt head which plug prevents contamination and the like from entering the socket of the bolt and can be adjusted to be absolutely flush with the bolt head.

I claim:

1. In a fastener assembly comprising:
   a bolt having an enlarged head at one end and a nose at the other end, said bolt being threaded for threaded engagement to the threaded portion of a receptacle assembly, said head having a socket therein configured to a tool adapted to be inserted into said socket to rotate said bolt, a spring biased plug mounted in said socket and configured similarly thereto having an outer surface flush with the portion of the head of said bolt surrounding said socket, the improvement which comprises:
   adjusting means for adjusting the position of said plug in said socket so that the upper surface of said plug is flush with the upper surface of said bolt head, said adjusting means including said plug being threaded on the interior thereof, an apertured flange separating said socket from said threaded portion of said bolt, said adjusting means further including a screw having a threaded shaft threadably engaging the interior of said plug, said screw also having an enlarged slotted head abutting against said flange whereby rotation of said screw moves said plug up and down within said socket.

2. In the assembly of claim 1 including self locking means associated with both said screw and said plug.

3. In the assembly of claim 2 wherein said self locking means includes an adhesive surrounding said threaded shaft and engaging the threaded interior of said plug.

4. A fastener assembly comprising:
   a bolt having an elongated shaft, a nose at one end of said shaft and an enlarged head at the other end of said shaft, said bolt having a threaded portion on the interior thereof opening out of said bolt adjacent said nose;
   a socket having an irregularly shaped inner wall formed in said enlarged head, and an apertured flange in said bolt separating said socket from said bolt threaded portion, the aperture in said flange being of lesser diameter than the inner diameter of both said bolt threaded portion and said socket;
   a plug having an enlarged head at one end similarly configured to the inner wall of said socket, and an elongated body portion extending into said socket and through said aperture in said flange, the diameter of said plug enlarged head being slightly less than the diameter of said socket, said plug having a threaded portion on the interior of said plug body portion;

a spring encircling said plug body portion of an inner diameter slightly less than the outer diameter of said plug body portion and abutting against said plug enlarged head at one end and said flange at the other end; and a screw having an elongated threaded shaft at one end threadably engaging said plug threaded portion and a slotted enlarged head at the other end of an outer diameter greater than the inner diameter of said flange aperture and abutting against said flange on the side thereof opposite where said spring abuts against said flange.

5. In the fastener assembly of claim 4 wherein the underside of the enlarged head of said bolt is tapered.

6. In the fastener assembly of claim 4 wherein said bolt shaft has a first upper portion of a first outer diameter, and a second lower portion terminating at said nose of a second outer diameter less than said first outer diameter of said first upper portion, and a tapered portion leading from said first upper portion to said second lower portion.

7. In the fastener assembly of claim 4 wherein the outer diameter of said plug body is slightly less than the inner diameter of said flange aperture.

8. In the fastener assembly of claim 4 including locking means associated with both said plug threaded portion and said screw threaded shaft locking said screw threaded shaft to said plug.

9. In the fastener assembly of claim 8 wherein said self locking means is an adhesive.

10. In the fastener assembly of claim 9 wherein said adhesive is a normally dry adhesive which sets by forces acting on the assembly.

* * * * *